United States Patent [19]

Rhodes

[11] 3,889,113
[45] June 10, 1975

[54] RADIOISOTOPE-EXCITED, ENERGY-DISPERSIVE X-RAY FLUORESCENCE APPARATUS

[75] Inventor: John R. Rhodes, Austin, Tex.

[73] Assignee: Columbia Scientific Industries, Inc., Austin, Tex.

[22] Filed: May 3, 1973

[21] Appl. No.: 356,830

[52] U.S. Cl. ............................... 250/272; 250/494
[51] Int. Cl. ............................................ H01j 37/20
[58] Field of Search ........... 250/272, 273, 308, 370, 250/494, 496

[56] References Cited
UNITED STATES PATENTS

| | | | |
|---|---|---|---|
| 3,011,060 | 11/1961 | Dorenbosch | 250/272 |
| 3,012,143 | 12/1961 | Cheek | 250/308 |
| 3,462,598 | 8/1969 | Burke | 250/272 |
| 3,621,245 | 11/1971 | Clayton | 250/272 |
| 3,662,882 | 5/1972 | Obermayer | 250/273 |
| 3,665,199 | 5/1972 | Cahill | 250/494 |
| 3,710,119 | 1/1973 | Eymery | 250/494 |
| 3,751,661 | 8/1973 | Packer | 250/272 |

Primary Examiner—James W. Lawrence
Assistant Examiner—D. C. Nelms

[57] ABSTRACT

Radioisotope-excited, energy-dispersive, X-ray fluorescence apparatus for positioning a plurality of disc sources in annular configuration in a helium-filled compartment and about the window of the vacuum cryostat housing the detector. The specimen holder leaves the specimen in air and the area and spacing of the specimen, detector and sources are such as to optimize operation about the plateau of the count rate distance curve and to produce an essentially flat detector response profile curve, with a well-defined cut-off.

16 Claims, 4 Drawing Figures

RADIOISOTOPE-EXCITED, ENERGY-DISPERSIVE X-RAY FLUORESCENCE APPARATUS

BACKGROUND OF THE INVENTION

1. Field of the Invention

This invention relates to isotope-excited, energy-dispersive, X-ray fluorescence analysis and more specifically to optimum geometrical arrangements for apparatus used in such analysis.

2. Description of the Prior Art

A radioisotope fluorescence analyzer comprises the following basic components: a sealed radioisotope excitation source; a detection system for selecting the energies of the characteristic X-rays excited and measuring their intensities; and an electronic amplification and readout system whose output can be correlated with the concentration of the elements present in a specimen under analysis.

A conventional X-ray spectrometer utilizes an X-ray tube as either the primary or secondary excitation source, together with diffracting crystals, goniometers, special collimators and the like. However, a radioisotope X-ray fluorescence analyzer does not utilize these components primarily because dispersion is not produced by diffraction. X-ray dose rates using radioisotope sources are on the order of six orders of magnitude less than that from an X-ray tube, or typically, radioisotope sources emit only about $10^7$–$10^8$ photons per second. However, geometrical efficiencies are high relative to analyzers using X-ray tubes, making it possible to use such sources and obtain comparable results.

A practical source-specimen-detector arrangment for radioisotope X-ray spectrometry desirably has all of the following qualities to the maximum or optimum extent possible:

1. good geometrical efficiency,
2. negligible background due to direct transmission of radiation from source to detector,
3. low background due to scatter or fluorescence from the instrument structure,
4. good fluorescence-to-scatter radiation intensity ratios from specimens of standard size (i.e., 1–1.5 inches in diameter),
5. low sensitivity to movement of the specimen toward or away from the detector, and
6. sufficient shielding so that the radiation dose rate at accessible points outside the measuring area is below regulation levels.

At least four generic physical configurations have been tried wherein the source and detector are on the same side of the specimen to thereby prevent emissions directed to the specimen from continuing straight through to the detector. These four geometrical configurations may be characterized as (1) central source geometry, (2) side source geometry, (3) collimated beam geometry, and (4) annular source geometry.

The central source geometry locates the source between the detector and specimen and in a concentric relationship to each. The surface area of detector in this instance is much greater than the surface area of the source so that radiation from the specimen is detected without undue shielding by the source. The side source geometry has the specimen at somewhat of an angle to the detector. The source is at a slight angle and to one side of both the specimen and the detector. This positioning permits the source to irradiate the specimen and for the specimen to then, in turn, irradiate the detector. The collimated beam geometry is similar to the side source geometry except that the emissions from the source are emitted through a tunnel to the specimen.

The annular source arrangement utilizes a ring source concentric with and surrounding the detector. Radiations from the ring are directed to the specimen uniformly from all sides. The centrally located detector then receives the radiations from the specimen without any interference of a centrally located source.

In addition to the physical juxtaposition of the source, specimen and detector, there are other details of the physical arrangements that effect the results obtained. Some of these details include (1) the physical dimensions of the component parts, (2) the nature of the source and the emission characteristics of the source, and (3) the preparation of the specimen.

For example, the central source geometrical arrangement has found wide spread application with large detector windows. The geometrical efficiency for a 2-inch diameter detector window, a 2-inch diameter specimen and a ½-inch diameter source approaches ten percent. When the window is reduced, however, the efficiency falls off markedly.

The most widely used excitation method is by primary X-ray sources, preferably those that emit one or a few spectral lines, rather than a high proportion of continuous radiation. The major advantage of these preferred sources is that they excite characteristic X-rays efficiently with minimum background in the energy region of interest. A very wide range of such sources is available in the desired energy range, 5 to 150 keV, and with suitable specific activities, half-lives and encapsulations. The specific activity should be high enough to yield a source of emission of $10^7$ to $10^8$ photons per second from a 1 cm$^2$ surface. Sources larger than this and/or having special shapes, such as a ring configuration, are relatively expensive.

The central source geometry has the obvious disadvantage of shielding the detector from the radiations of the specimen. When the detector and/or the sample area is relatively small, then the collection efficiencies of the analyzer are very poor. Side source and collimated geometry do not permit very close positioning of the component parts. Therefore, such configurations introduce a marked reduction in efficiency compared to configurations permitting closer and more uniform positioning.

Ring sources in what the prior art refers to as "annular" geometry have been used successfully with the small, but very desirably sensitive, Si(Li-drifted) and Ge(Li-drifted) detectors that are now in use. However, as previously mentioned, ring sources are expensive and difficult to fabricate. Typically, the radioactivity for the source is contained in the primary capsule by electrodeposition, or as a compacted powder briquette with aluminum, or as a ceramic enamel. Whereas small discs can be made uniformly quite satisfactorily, a relatively large area ring cannot be so easily made. Moreover, a ring cannot be optimized as to diameter of opening, thickness and angle of inclination in accordance with this invention for each set of values, as hereinafter explained.

It is also true that the apparatus has to keep the detector and source as free from contamination, due to sample losses, as possible. The Si(Li) and Ge(Li) detectors are normally housed in a cryostat, a cryogenically cooled and evacuated compartment. The source and specimens are normally placed in another compartment opposite the detector that is flushed and filled with helium. If it is assumed that the source and specimen are not going to be changed very often, then this arrangement is satisfactory. It is not uncommon, however, to have a plurality of specimens or samples to analyze using the same source-detector set-up. Evacuating and filling the source-specimen compartment with helium each time there is a specimen change is extremely cumbersome and time consuming. For example, it takes hours to completely flush a compartment 6 inches high and 3 feet wide.

It is not uncommon, for example, to analyze 100 or more different, but related, samples in order to digest a single result. Sampling and analyzing air particulates gathered at the same time, but at different locations around a city, is just a single possible application. The time and inconvenience required in changing samples is discouraging to thorough-going analysis.

Furthermore, the compartmentalizing of components in prior art analyzers does not lend itself to flexible adjustment for optimizing results. That is, although for one set of conditions a particular arrangement might produce fairly good results, a change of source, detector and/or sample might cause fairly poor results from the next measurement without any convenient means to improve them. It has not been appreciated or recognized what physical parameters needed to be adjustable in order to obtain the best results possible.

Therefore, it is a feature of this invention to provide an improved "annular" source-specimen-detector geometric arrangement for radioisotope X-ray spectrometry.

It is another feature of this invention to provide an improved radioisotope X-ray spectrometry assembly that permits the specimen under analysis to stay in air while the source and detector are located in a "pure" environment, with very little performance loss.

It is still another feature of this invention to provide an improved radioisotope X-ray spectrometry assembly that permits the specimen under analysis to stay in air closely positioned with respect to a thin window that is not subjected to a pressure differential and which is easily replaceable, to prevent bowing of the window and to permit frequent changing, thereby minimizing microgram amounts of extraneous materials from accumulating and contaminating the results.

It is yet another feature of this invention to provide an improved radioisotope X-ray spectrometry assembly geometry for optimizing the results obtained by minimizing the effects of such geometry.

SUMMARY OF THE INVENTION

A preferred embodiment of the present invention comprises, in a radioisotope fluorescence analyzer, four, six or eight substantially identically disc-shaped, sealed radioisotope sources arranged in annular geometry surrounding the window of a Si(Li) detector. The sources forming the annular array need not be all the same, depending on the range of elements being investigated. These sources occupy a common compartment suitable for being flushed and filled with helium. The detector is located in a vacuum cryostat and receives radiation from a specimen irradiated by the sources, from which the detection system develops information for constituent analysis. The holder for the specimen is placed in air, and within about 0.1 inches from the window covering the compartment housing the sources, thereby establishing a low absorbing path for light-element X-rays while leaving the specimen in air. The size of the source array, specimen and detector opening and the distance between the source array, the specimen and the detector are positioned so that operation is at or very near the plateau on the count rate distance curve and so that the detector response profile across the specimen is nearly flat, with a sharply defined boundary.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings.

DESCRIPTION OF PREFERRED EMBODIMENTS

Figure 1:
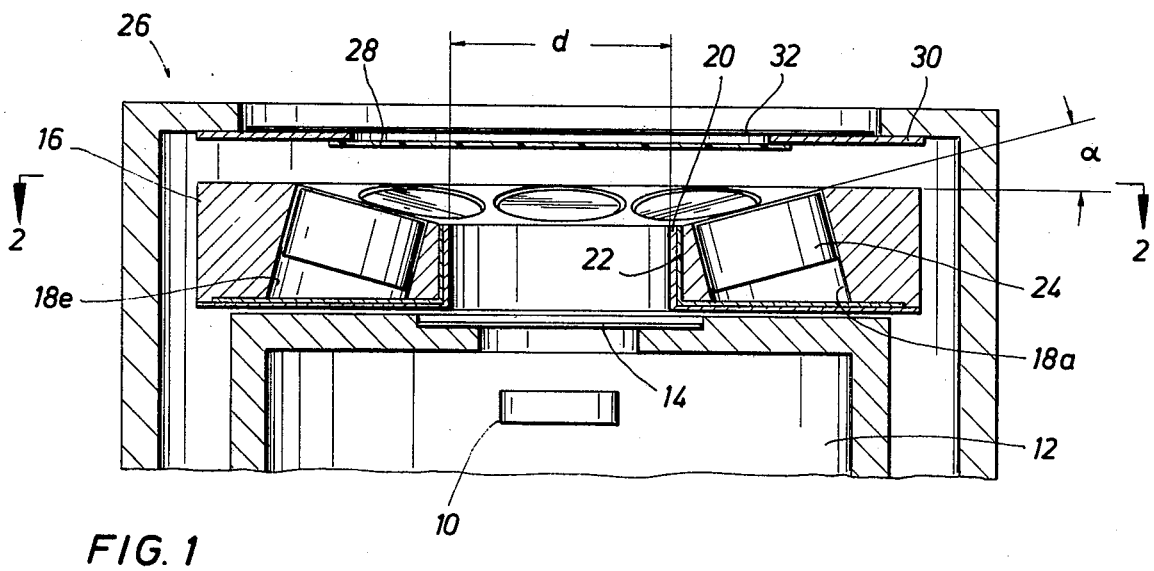
FIG. 1 is a cross-sectional side view of apparatus in accordance with a preferred embodiment of the present invention.

Now referring to the drawings and first to FIG. 1, a Si(Li) detector 10 is shown housed in a vacuum cryostat 12. A particular detector mounting is not shown, but any suitable mounting presently well-known in the art is satisfactory. Radiations are detected from the specimen in a manner to be hereinafter described through detector window 14, normally made of beryllium. The detector window is usually no larger than about 10 mm. The cryostat is connected to means (not shown) for evacuation, so that the detector operates in its usual vacuum environment.

Figure 2:
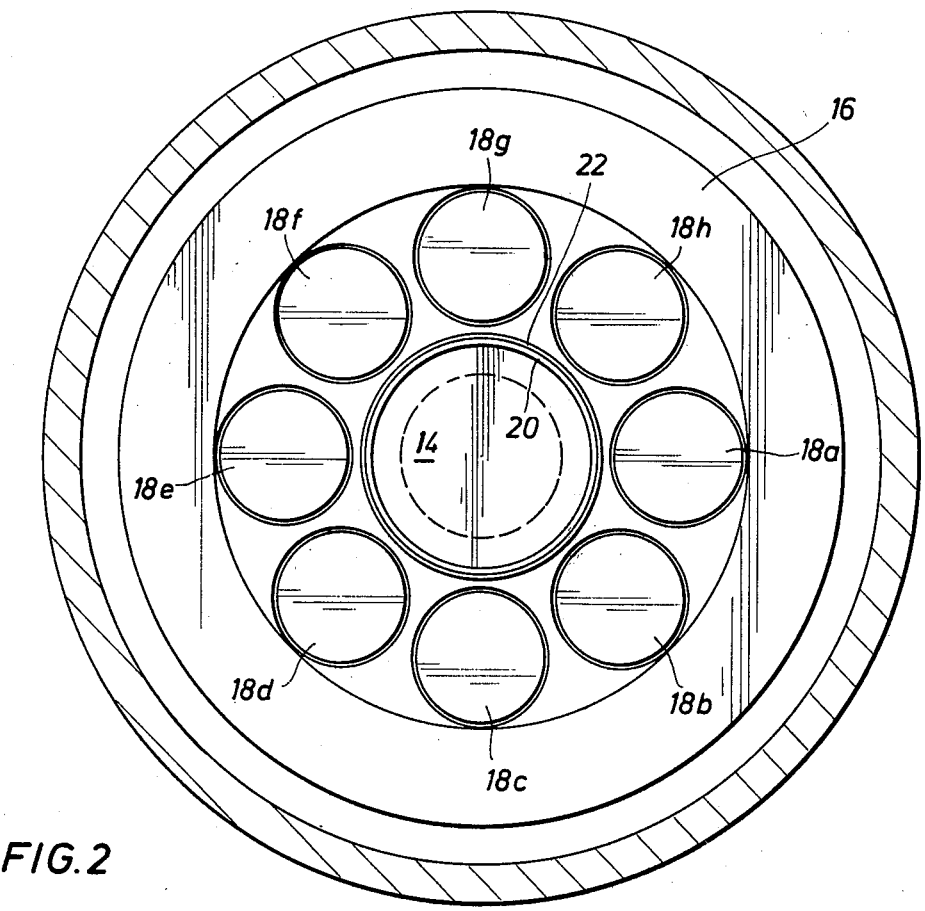
FIG. 2 is a top view of the apparatus shown in FIG. 1.

In the near vicinity surrounding detector window 14 is aluminum source holder 16. Source holder 16 has a central opening concentric with window 14 and is slightly larger, as best illustrated in FIG. 2. Evenly spaced about this central opening are eight bores 18a–18h in source holder 16. Each of these bores is inclined at a slight angle toward the axis defined by the central opening. The angulation importance will be more fully explained hereinafter. The diameter of the central opening of the source holder 16, marked d on the drawing, is adjustable by any convenient means (not shown) to maintain the substantially circular geometry of the bores. Further, although eight bores are illustrated, four or six evenly spaced bores may be suitable for a particular analysis.

Embedded in source 16 and located in the area between bores 18a–18h and the central opening of source 16 are two shields, namely, cadmium foil shield 20 and gold foil shield 22. As shown, the cadmium foil shield is closest to the central opening. Further, the two foil shields continue underneath the bores, also as illustrated.

In use, each one of bores 18a–18h accommodates a substantially identically shaped radioisotope disc source 24. Source holder 16 and the disc sources 24 are included in a compartment between the detector assembly (cryostat 12 and detector 10) and the specimen holder assembly 26. During use, this source compartment is flushed of the normal environmental air and filled with helium.

The sources forming the source array need not be all the same. Two or more different types may, if desired, be mixed, yielding two or more excitation energy groups. This increases the range of elements able to be analyzed per irradiation, and is very useful as long as the sources are chosen so as not to interfere with each other's analysis.

Specimen holder assembly 26 has a rather large opening closed by thin plastic window 28. Typically, window 28 may be 1/7 mil mylar. Specimen aperture 30 determines the size of this window and supports specimen disc 32. The aperture material is cadmium. The specimen disc contains as nearly a uniform deposit as possible of the material to be analyzed over the area opposite window 28. It is desirable to locate the source close to window 28, normally within 0.1 inches.

Optimization is desirable for each new detector configuration and for each new specification. It may be observed that optimization of $d$ and $\alpha$ in FIG. 1 under various conditions of analysis is virtually impossible with a continuous ring source. That is, a new source would have to be inserted for each set of $d$, $\alpha$ values. With disc sources, the holder may be adjusted, or even a new holder may be inserted when holders are used having the distances and angles fixed. In this case, the cost of a holder may be on the order of $10–15, as opposed to the cost of a new ring source, which would be on the order of $1,500–2,000.

Window 28 must be as thin as possible for maximum X-ray transmission. Because the helium atmosphere in the compartment housing the source array may be made to be at the same pressure as the air outside, there is no requirement for window 28 to support a pressure differential. In prior art analyzers wherein the source and the detector were housed in the same evacuated space, a bowing inward of the window away from the specimen occurred. In the FIG. 1 embodiment, there is no bowing of the window and hence no increasing of the air path between window 28 and specimen 32. Optimally, this air space should be 0.02–0.04 inches to maintain low and constant absorption for good measurement precision.

Moreover, thin window 28 should be held in place in a manner to permit quick and easy replacement. Contamination by even microgram amounts of extraneous material is serious because this can cause spurious peaks to appear in the spectrum developed by the analyzer. As previously mentioned, the window is thin and therefore fragile and not easily cleaned. But, the contamination build-up is avoided by merely changing the window whenever the need arises.

Figure 3:
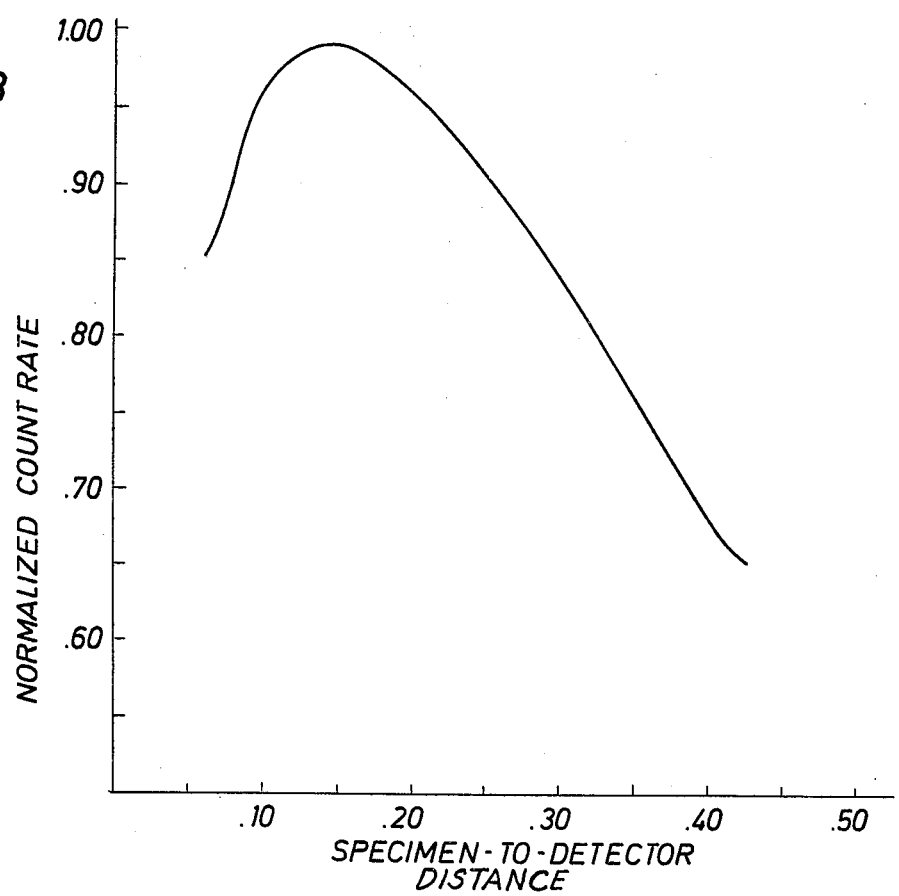
FIG. 3 is a typical count rate distance curve for the apparatus shown in FIGS. 1 and 2.
Figure 4:
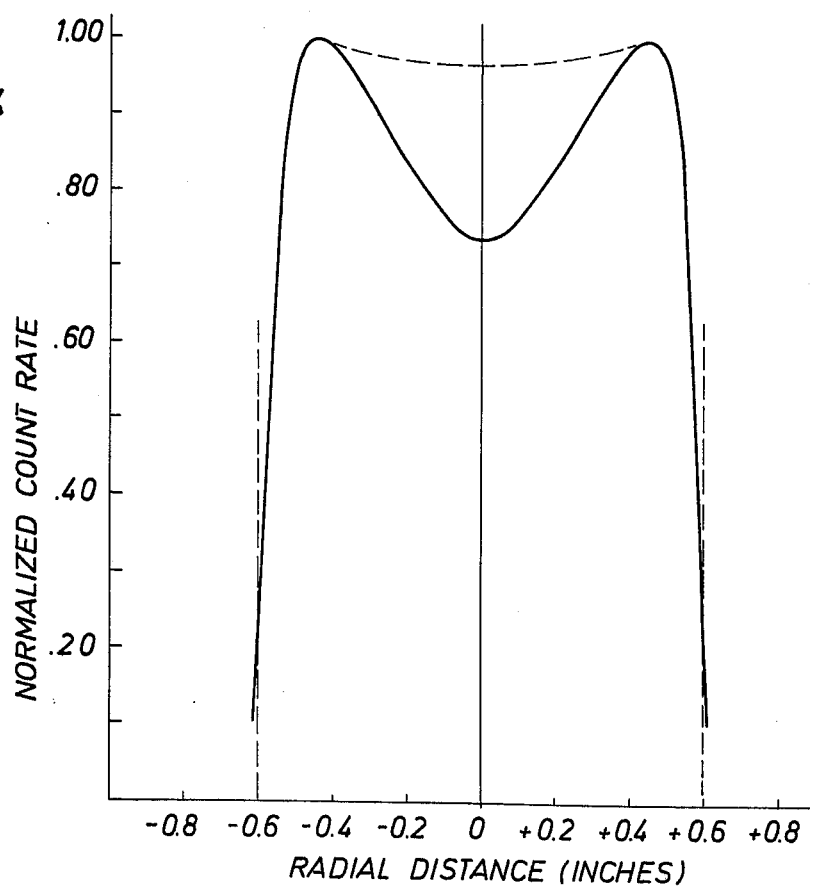
FIG. 4 is a typical detector response profile curve for the apparatus shown in FIGS. 1 and 2.

Now turning to FIGS. 3 and 4, two typical performance curves are illustrated. FIG. 3 is the so-called count rate distance curve. Plotted on the abscissa is the specimen to detector distance. Plotted on the ordinate is the normalized count rate. By adjusting the specimen to detector distance so that operation is near the plateau or rounded apex of the curve, variation in the distance of the sample has little effect on the count rate. Optimum positioning is where the count rate distance plateau decreases less than ½ percent for a change in relative position of specimen to detector of 0.02 inches.

The angle of inclination of the source array, marked $\alpha$ in FIG. 1, is chosen to be between 0° and 20° for best results. The angle must be such that the count rate distance plateau is accessible to the sample. Too large an inclination places operation on the long sloping side on the right side of FIG. 3.

FIG. 4 shows some typical plots of detector response against specimen position and may be obtained by moving pin-head size specimens across the aperture or window 28 of the FIG. 1 structure. The curve that is traced is known as the detector response profile. It has been discovered that nearly uniform irradiation of the specimen, and hence a nearly flat profile, may be obtained by using the plurality of sources shown in FIGS. 1 and 2 and by adjusting the source-specimen distance by any convenient means (not shown). Whereas the solid line path may be obtained under ordinary placement but without careful positioning, careful positioning may result in the establishment of the profile shown by broken lines, where the profile has an approximately flat response within 10 percent of maximum. Also, inclined sources as previously discussed help achieve the result of minimizing the profile dip at the center. For a given distance relationship between source and specimen and detector, the flatness of the profile is a function of the area of the source, detector and window 28.

In addition to the flat center response, it is also vital for the response profile to fall off markedly at the outer edges for the sample area measured. Optimum positioning of source-to-specimen will not only flatten the center dip to within 10 percent of maximum, it will also cause a fall-off to 50 percent of its maximum value within a 0.02 inch radius. Even a 0.04 inch radial variation could cause vastly depreciated results.

The source array, the geometrical configuration of source, specimen and detector, and the materials used combine the following advantages:

1. Geometrical efficiency (i.e., signal count rate per unit source output) is significantly higher than for flat annuli,
2. Unwanted scatter and fluorescence from the structure is minimized,
3. The curve of count rate against specimen distance exhibits a stationary value at a convenient distance for normal specimen positioning, thereby eliminating errors of measurement due to inaccurate specimen positioning or surface irregularity of the specimen,
4. The source radiation polar diagram is well-concentrated over the normal specimen area (i.e., 1.25 in. dia.) with very little detector response from radiation falling on the surrounding structure,
5. An array of standard disc sources is used. This cuts costs because firstly the sources are standard and secondly, quantities of sources are usually purchased,
6. The array can consist of more than one source type, resulting in increased flexibility for exciting a wider range of elements in the specimen, and

What is claimed is:

1. In a radioisotope X-ray fluorescence analyzer for analyzation of specimens in an atmospheric environment, said analyzer including
   a sealed radioisotope excitation source means, and
   a detection system for selecting the energies of the characteristic X-rays excited in a specimen under analysis and measuring their intensities,
the improvement, comprising
   a first holder for the source means, said holder defining a plurality of receptacles disposed in annular array, said source means being a plurality of radioactive sources being disposed one within each of said receptacles,
   a second holder for a detector in the detection system, said first and second holders being located on the same side of the specimen,
   said first holder being encased in a helium-filled compartment having a window toward the specimen, the source being located at a distance in the range of 0.05 to 0.4 inch of said window and the specimen being positionable in the atmospheric environment on the side of said window opposite said source.

2. A radioisotope X-ray fluorescence analyzer as set forth in claim 1, wherein said window between the source and specimen is a membrane composed of Mylar.

3. A radioisotope X-ray fluorescence analyzer as set forth in claim 1, wherein the pressure in said helium-filled compartment is substantially equal to atmospheric pressure.

4. A radioisotope X-ray fluorescence analyzer as set forth in claim 1, wherein the apace between the specimen and the window located between the source and specimen is less than 0.05 inches.

5. A radioisotope X-ray fluorescence analyzer as set forth in claim 1, wherein
   said receptacles of said first holder comprise a plurality of bores for receiving substantially identically shaped disc sources about an annular aperture, and
   said radioactive elements defining said source comprise an array of substantially identically shaped disc sources retained within said plurality of bores.

6. A radioisotope X-ray fluorescence analyzer as set forth in claim 5, wherein said plurality of substantially identically shaped disc sources includes discs of a first radioactive material and discs of a second radioactive material.

7. A radioisotope X-ray fluorescence analyzer as set forth in claim 5, wherein said plurality of bores are each inclined toward the axis of said annular aperture by not more than 20°.

8. A radioisotope X-ray fluorescence analyzer as set forth in claim 5, wherein said first holder is replaceable.

9. In a radioisotope X-ray fluorescence analyzer for analyzing specimens in an atmospheric environment, said analyzer including
   a sealed radioisotope excitation source means of annular geometry, and
   a detection system for selecting the energies of the characteristic X-rays excited in a specimen under analysis and measuring their intensities,
the improvement, comprising
   a first holder for the source located at a diatance from said specimen in the range of 0.05 to 0.20 inch, within which range a detector response profile is produced having an approximately flat response within 10 percent of maximum, said holder defining a plurality of receptacles and a central aperture about which said receptacles are defined, said source means being a plurality of radioactive elements received one within each of said receptacles, and
   a second holder for a detector in the detection system, said first and second holders being located on the same side of the specimen.

10. A radioisotope X-ray fluorescence analyzer as set forth in claim 9, wherein
   said receptacles within said first holder comprise a plurality of bores for receiving substantially identically shaped disc sources about said central aperture, and
   said source is an array of substantially identically shaped disc sources received within said plurality of bores.

11. A radioisotope X-ray fluorescence analyzer as set forth in claim 9, including a shield between said first and second holders.

12. A radioisotope X-ray fluorescence analyzer as set forth in claim 9, wherein the distance from said source to said specimen assures a fall-off to 50 percent of maximum value within a 0.02 inch radius.

13. In a radioisotope X-ray fluorescence analyzer including
   a sealed radioisotope excitation source means of annular geometry, and
   a detection system for selecting the energies of the characteristic X-rays excited in a specimen under analysis and measuring their intensities,
the improvement, comprising
   a first holder for the source,
   a second holder for a detector in the detection system, said first and second holders being located on the same side of the specimen, said second holder located at a distance from said specimen to provide operation near the plateau of the count rate distance curve.

14. A radioisotope X-ray fluorescence analyzer as set forth in claim 13, wherein said count rate distance plateau decreases less than about ½ percent for a change in relative position of said specimen and said detector of 0.02 inches.

15. In a radioisotope X-ray fluorescence analyzer including
   a sealed radioisotope excitation source of annular geometry, and
   a detection system for selecting the energies of the characteristic X-rays excited in a specimen under analysis and measuring their intensities,
the improvement, comprising
   a first holder for the source located at a distance in the range of 0.1 inches to 0.14 inches from said specimen for producing a detector response profile having an approximately flat response within 10 percent of maximum, and a second holder for a detector in the detection system, said first and second holders being located on the said side of the specimen, said second holder located at a distance from said specimen to provide operation near the plateau of the count rate distance curve.

16. A radioisotope X-ray fluorescence analyzer as set forth in claim 15, wherein the distance from said source to said specimen assures a fall-off to 50 percent of maximum value with a 0.02 inch radius, and said count rate distance plateau decreases less than about ½ percent for a change in relative position of said specimen and said detector of 0.02 inches.

* * * * *